Patented Apr. 1, 1941

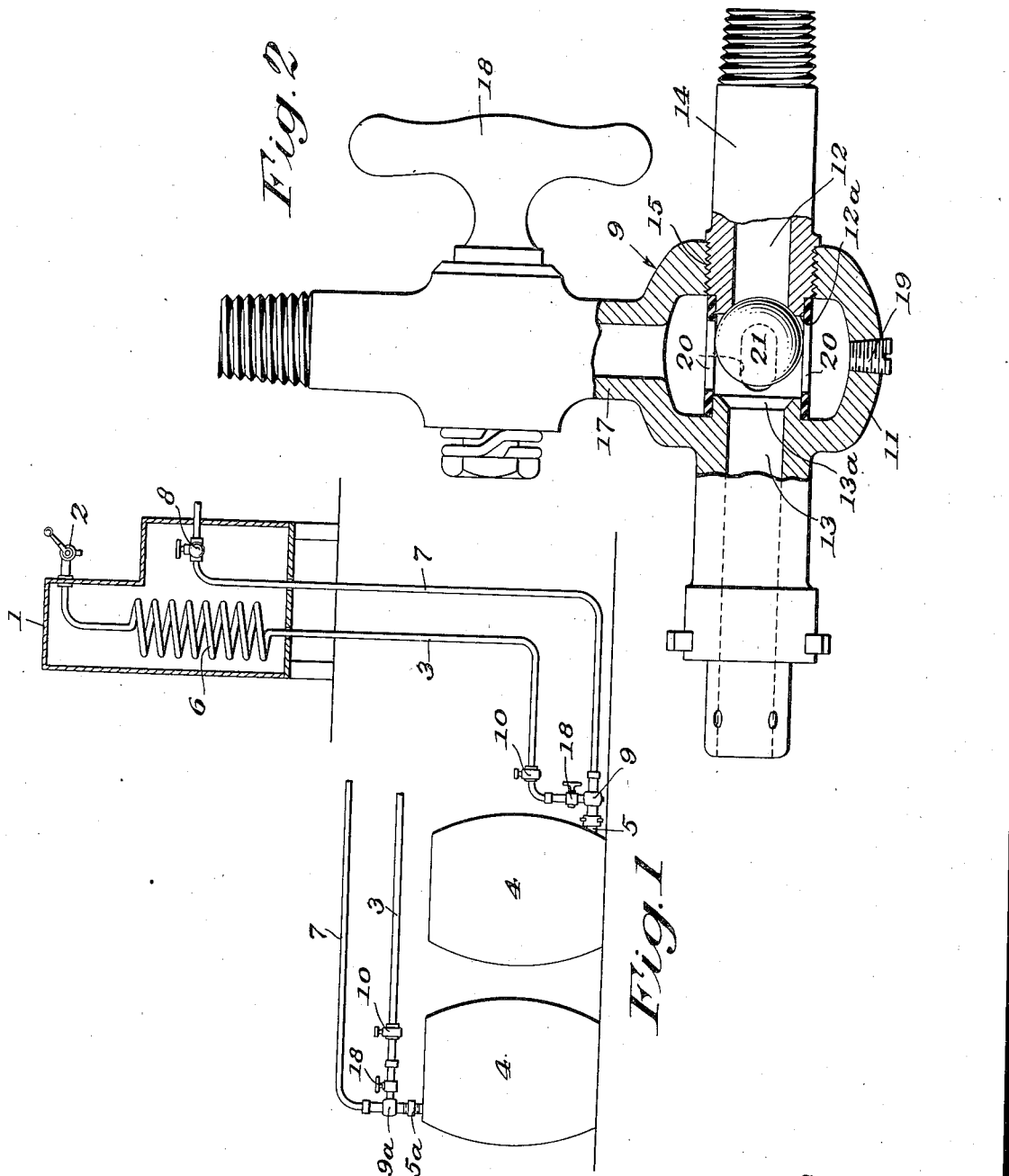

2,237,014

UNITED STATES PATENT OFFICE 2,237,014

BEVERAGE DISPENSING SYSTEM

Carl Stoehrer, Lawrence, Mass.

Application April 18, 1940, Serial No. 330,282

6 Claims. (Cl. 225—12)

My present invention relates to improvements in systems for dispensing beverages under pressure.

Systems of the type with which I am concerned include relatively long conduits from the beverage sources to the taps and these conduits include cooling coils. Since these conduits must always be clean, they must be cleansed with regularity and such cleansing is particularly important and difficult with malt beverages. While my invention may be employed in any beverage dispensing systems where the beverage is under pressure, the problems presented in the dispensing of malt beverages well illustrate the problems solved by my invention.

It has been proposed that the conduits could be maintained in proper condition by flushing them regularly with water or other suitable cleansing liquid. In certain proposals, the use of pressure operated valve mechanism has been suggested by which the water pressure when admitted into the delivery line by the attendant would close the flow of the beverage from its source. This proposal is practicable since almost every water system has a pressure far in excess of the maximum pressure on the beverage.

Because the maximum advantages of this concept require that the conduit be filled every night with water so that the system may be flushed before use, as the first thing in the morning, the quantity and quality of the displaced beverage is of controlling importance. In most installations, the conduits extend a considerable distance from the counter or bar to the room where the barrels or other containers are connected into the system and the length of the conduit determines the volume of beverage to be displaced. While it is true that beverage standing in the system for any appreciable length of time becomes flat and entirely unfit for use, one of the advantages of my invention is that the pipe line contents can be utilized in perfect condition with a consequent substantial saving in addition to the economy involved in maintaining the line clean by this method.

Because of the substantial increase in pressure of the water necessary to automatically close the flow of the beverage into the delivery line, the pipe line contents could not be salvaged with the result that this otherwise satisfactory method was not accepted.

In accordance with my present invention, I overcome this objectionable feature by incorporating in the conduit intermediate the pressure operable valve and the bar or counter, adjustable means to regulate the pressure of the delivered beverage when the cleansing liquid source is connected to the delivery line. By making it impossible for predetermined pressures to be exceeded, I am able to draw off substantially the entire contents of the delivery line after the water source has been connected into the line without interfering with its quality.

In the accompanying drawing, I have shown an illustrative embodiment of my invention from which its novel features and advantages will be readily apparent. In the drawing:

Fig. 1 is a schematic view of a typical installation.

Fig. 2 is an enlarged fragmentary view of the system showing the details of construction of the pressure operable control valves.

In Fig. 1, I have generally indicated at 1, a bar or counter having a faucet 2 in the conduit 3. The conduit 3 typically extends into the basement where barrels 4 are connected into the system as by the usual taps 5 and 5ª. Cooling coils are indicated at 6. A water conduit 7, controlled by the valve 8 preferably located adjacent the bar 1, and the conduits 3 are connected by pressure operated valve units 9 and 9ª. The conduit 3 includes an adjustable pressure regulating or reducing valve 10 of any standard construction.

It will be appreciated that in most installations, several different beverage sources are connected to the bar or counter. For example, beer and ale or different types of beer and ale are generally on tap. In such installations, the separate delivery conduit for each beverage includes a valve unit 9 and a pressure reducing or regulating valve 10. A single water conduit 7 may be connected to each of the units 9 so that the flushing of the several delivery conduits is under the control of a single valve 8.

The details of construction of the unit 9 are shown in Fig. 2. The valve unit 9 comprises a casing 11 having alined inlet ports 12 and 13 having protruding valve seat portions 12ª and 13ª. The inlet port 12 is formed by the fitting 14 threaded into the threaded aperture 15 of the casing 11. The casing inlet port 13 is in the tap portion 5. Where a Peerless type of tap, as shown at 5ª in Fig. 1 is desired, the valve unit 9ª and the tap 5ª are formed to have a threaded engagement. The outlet 17 of the valve units is preferably controlled by shut-off valve 18 and is shown as connected to the conduit 3 in a conventional manner. The casing 11 may be drained by removing the plug 19 when the valve 8 is closed and the tap removed from a barrel.

In the assembly of the valve unit 9, I insert a tubular slotted guide 20 through the aperture 15 so that it is centered by the valve seat portion 13a and then insert the ball-shaped valve element 21. The element 21 may be made of stock that deforms slightly under pressure to establish a tight seal without the necessity of fine machining. The guide 20 is locked in place by the seat portion 12a of the fitting 14. The guide 20 and the ball-shaped valve element 21 are preferably of non-corrosive material whereby the positive action of the valve is ensured.

From the structure that I have thus far described, it will be appreciated that with the beverage in the container 4 under a normal pressure of twelve pounds, for example, the ball 21 will be positioned as shown in Fig. 2 so long as the valve 8 in the water line 7 is closed. The normal water system is under a pressure of fifty pounds per square inch or more, which pressure is substantially in excess of any selected pressure on the beverage.

In accordance with my invention, when it is desired to flush out the delivery line 3, the valve 8 is opened and the pressure of the water moves the ball 21 to stop the flow of the beverage. The beverage in the line 3 may accordingly be forced out and the line flushed. If desired, the line 3 may be left filled with water overnight.

While the cleansing of the delivery line 3 may be done whenever desired, economy rquires that the pipe line contents be utilized, and in order to accomplish this result I employ in the pipe line 3, preferably adjacent the valve unit 9, the pressure reducing valve 10 by which the water pressure in the line 3 is reduced sufficiently to enable the beverages to be drawn off in its normal state while ensuring a pressure on the ball 21 adequate to check the flow of beverage under pressure.

In accordance with my invention, beverage dispensing systems may be maintained in proper order with a minimum of effort and the beverage served with maximum economy.

What I therefore claim and desire to secure by Letters Patent is:

1. A delivery system for a source of beverage under pressure, said system comprising a delivery conduit, a second conduit to be connected to a source of cleansing liquid under a pressure in excess of that on said beverage, pressure operable valve means to connect said beverage source and said second conduit to said delivery conduit, the pressure on said beverage normally maintaining said valve means in a position admitting the beverage to said delivery conduit, a shut-off valve in control of said second conduit, and pressure regulating means in said delivery conduit to reduce the pressure therein when said shut-off valve is opened to disconnect said beverage source from said delivery conduit and to replace the beverage in said delivery conduit.

2. A delivery system for a source of beverage under pressure, a source of cleansing liquid under a pressure substantially in excess of the pressure on said beverage, a delivery conduit, means to connect either of said sources to said delivery conduit, and pressure regulating means in said delivery conduit to ensure against excessive pressures in said delivery conduit.

3. A delivery system for a source of beverage under pressure, a valve controlled source of cleansing liquid under a pressure substantially in excess of the pressure on said beverage, a delivery conduit, pressure operable means to connect either of said sources to said delivery conduit, the pressures on said sources being such that the pressure of said cleansing liquid is effective to disconnect said beverage source from said delivery conduit, and means in said delivery conduit to maintain the pressure therein suitable to displace the beverage therein in its normal condition when said cleansing source is connected thereto.

4. A delivery system for a source of beverage under pressure, a delivery conduit, pressure regulating means in said delivery conduit, a source of cleaning liquid under pressure, pressure operable means to connect said sources to said delivery conduit, and a manually operable valve in control of one of said sources, the pressure on said valve controlled source being substantially in excess of the maximum pressure on the other of said sources so that when said manually operable valve is opened, said pressure operable means is positively actuated to disconnect said other source from said delivery conduit, said pressure regulating means maintaining the pressure in said delivery conduit below a predetermined pressure regardless of the pressure on either of said sources.

5. A delivery system for a source of beverage under pressure, a source of cleaning liquid under pressure, a delivery conduit, pressure operable means to connect said sources to said conduit, a manually operable valve intermediate said pressure operable means and said cleaning liquid source, the pressure on said beverage being sufficient to actuate and normally maintain said pressure operable means in a position to admit beverage to said conduit and the pressure on said liquid source being substantially greater than the pressure on said beverage so that when said manually operable valve is opened said pressure operable means are actuated to disconnect positively said beverage source from said delivery conduit and to admit cleaning liquid to said delivery conduit, and pressure regulating means in said delivery conduit to reduce the pressure of said cleaning liquid in said delivery conduit so that it becomes a substitute for the pressure on said beverage source in discharging beverage in said delivery conduit.

6. The system of claim 5 in which the pressure of said cleaning liquid is reduced by said pressure regulating means to the pressure on said source.

CARL STOEHRER.